A. D. HOFFMAN & A. MOODY.
Pie-Making Machine.

No. 227,630.    Patented May 18, 1880.

ATTEST.
a. G. Morey.
Austin D Hoffman

INVENTOR.
Alexander Moody
Austin D. Hoffman by
J. L. Chapin. Att'y

UNITED STATES PATENT OFFICE.

AUSTIN D. HOFFMAN AND ALEXANDER MOODY, OF CHICAGO, ILLINOIS; SAID HOFFMAN ASSIGNOR TO SAID MOODY.

PIE-MAKING MACHINE.

SPECIFICATION forming part of Letters Patent No. 227,630, dated May 18, 1880.

Application filed December 27, 1879.

*To all whom it may concern:*

Be it known that we, AUSTIN D. HOFFMAN and ALEXANDER MOODY, of Chicago, in the county of Cook and State of Illinois, have invented a new and useful Improvement in Machines for Making Pies, of which the following is a specification, reference being had to the accompanying drawings, illustrating the improvement.

Figure 1:
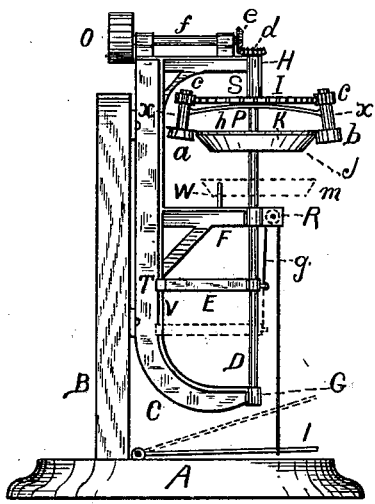
Figure 2:
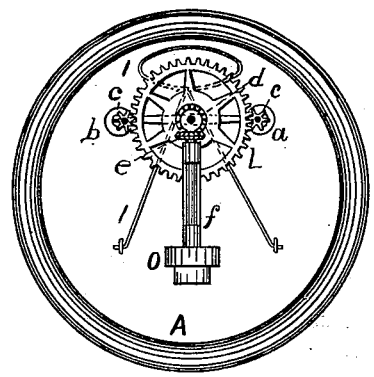
Figure 6:
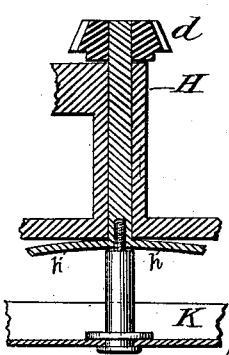
Figure 3:
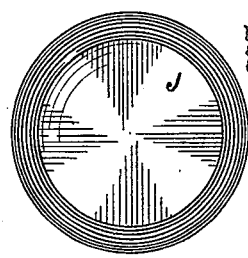
Figure 4:
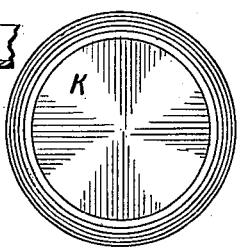
Figure 5:
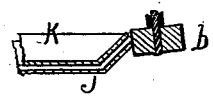

Figure 1 is a side elevation of our improved machine for making pies; Fig. 2, a top or plan view thereof. Figs. 3 and 4 are plan views of the pan-holder and crust-holder; Fig. 5, a broken section of said pan and crust-holder, also a section of the crust-trimmer. Figs. 3, 4, and 5 are enlarged to double the size of the same parts in Fig. 1. Fig. 6 is a vertical section of the crust-holder, its shaft, and a transverse section of the arms which support the crust-trimmers, showing how the crust-holder is attached by a screw, so as to be removable.

The object of the present invention is to provide means for trimming and uniting the crusts of pies; and the nature of the invention consists, first, in a pie-pan holder, in combination with a pie-crust holder, with mechanism for operating the same, and one or more rotating rollers for trimming the crust at the edges of the pie-pan, for making pies with an under crust only; second, in a pan-holder for making pies with upper crusts, combined with one or more rollers for cutting or trimming both crusts at the same time, as the whole is hereinafter fully described and shown.

A represents a base or foundation, which supports the mechanism hereinafter described. To this base is attached a strong standard, B, to which is secured by bolts, in the ordinary manner, a frame, C. Arms H F G project out from said frame, as shown at Fig. 1. The arms F G are for the support of a vertically-reciprocating rod, D, which supports on its top end a pie-pan holder, J. To prevent this holder J from rotating during the process of cutting the crust, an arm, E, is rigidly secured to it, and its opposite end is provided with prongs T, which embrace both edges of a flange, V, (projecting out from the inner face of the frame C,) and has a vertical reciprocating movement thereon corresponding to the movement of the rod D.

The pie-pan holder J is formed on the top side to receive a pie-pan, and a hole is made through it, that a pin, W, projecting up from the arm F, may raise the pie-pan from the holder J, so that it may be lifted out by the hand.

The arm H supports the circular rack L and forms a bearing for the shaft P to run in. This shaft supports two arms, $h$, to the ends of which are attached the boxes or bearings $x$ $x$, which support the shafts carrying the rollers or crust-trimmers $a$ $b$ and pinions $c$ $c$. A bevel-pinion, $d$, on the top of shaft P meshes into a bevel-pinion, $e$, on the end of a horizontal shaft, $f$, and is driven by a pulley, O, whereby the rollers $a$ $b$ are rotated on their journals and made to travel round the periphery of the pan-holder J. A pulley, R, is pivoted to the outer end of the arm F, and a rope or cord, $g$, attached to the rod D, passes over it and down to a treadle-lever, I, to which it is fastened, so that by bringing the treadle down with the foot the pan-holder J will be elevated to the position shown in Fig. 1, and so that when the foot is removed from the lever the pan J will occupy a position shown by dotted lines $m$.

In Figs. 1 and 5 the pan-holder J and crust-holder K are in position for the lower crust of a pie to be cut which is to have no upper crust. Where the pie is to have two crusts the lower crust is to be placed in the pie-pan and the pie-pan put in the holder J, and then the crust is filled and the upper crust put over with the surplus material of both crusts projecting over the peripheries of the pie-pan. The crust-holder K is then to be removed by disconnecting its shaft R, to permit the pie to be brought to the proper height without any pressure on its top part, and the treadle I brought down so as to bring pan-holder J and the pie-pan therein up opposite to the rollers or trimmers $a$ $b$, and held there till the latter sever the margins of the crusts by their rotation and pressure against the pie-pan.

The faces of the rollers $a$ $b$ may be figured, lettered, or flanged to mold the edge or edges of the crusts in any form desired, or so as to compress the crusts together or elevate their edges, so as to hold more filling.

It is well to state that quite a number of pans with lower crusts may be filled before the crust-holder is removed preparatory to trimming the upper crusts.

We claim and desire to secure by Letters Patent of the United States—

1. The pie-pan holder J, in combination with the treadle I, reciprocating rod D, with one or more rollers, *a b*, for trimming the crusts of "lower-crusted" pies, and the crust-holder K, for holding the crust to the pie-pan during the trimming process, as and for the purpose specified.

2. The combination of the pan-holder J with one or more trimming-rollers, *a b*, treadle I, cord *g*, reciprocating rod D, and push-pin W, for trimming the margins of double-crusted pies, as specified.

AUSTIN D. HOFFMAN.
ALEXANDER MOODY.

Witnesses:
G. L. CHAPIN,
A. H. MOREY.